(12) United States Patent
Choc (10) Patent No.: US 10,678,871 B2
(45) Date of Patent: *Jun. 9, 2020

(54) ACCELERATING FIND IN PAGE QUERIES WITHIN A WEB BROWSER

(71) Applicant: Google LLC, Mountain View, CA (US)

(72) Inventor: Theodore Nicholas Choc, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 130 days.

This patent is subject to a terminal disclaimer.

(21) Appl. No.: 15/490,841

(22) Filed: Apr. 18, 2017

(65) Prior Publication Data

US 2017/0220682 A1   Aug. 3, 2017

Related U.S. Application Data

(63) Continuation of application No. 13/857,931, filed on Apr. 5, 2013, now Pat. No. 9,652,494, which is a
(Continued)

(51) Int. Cl.
*G06F 16/00* (2019.01)
*G06F 16/951* (2019.01)
(Continued)

(52) U.S. Cl.
CPC .......... *G06F 16/951* (2019.01); *G06F 3/0482* (2013.01); *G06F 16/242* (2019.01);
(Continued)

(58) Field of Classification Search
CPC combination set(s) only.
See application file for complete search history.

(56) References Cited

U.S. PATENT DOCUMENTS 5,802,518 A     9/1998   Karaev et al.
5,819,271 A    10/1998   Mahoney et al.
(Continued)

OTHER PUBLICATIONS

"Use the address bar (omnibox)", Google Chrome Help, Mar. 21, 2012, retrieved from <http://support.google.com/chrome/bin/answer.py?hl=en&lev=index&cbid=j-p2kcar98v7k&answer=95440&src>.
(Continued)

*Primary Examiner* — Farhan M Syed
(74) *Attorney, Agent, or Firm* — Shumaker & Sieffert, P.A.

(57) ABSTRACT

Techniques for extending the functionality of a search field within a web browser to include a user-selectable accelerator option to invoke a find in page feature of the web browser are provided. A search query option for the find in page functionality of the browser may be displayed in association with the search field of the web browser. The search query option may include a user-selectable graphical component enabling the user to invoke find in page based on a search term entered into the search field of the browser. The user may select the graphical component to initiate a search for the term within a web page that is either displayed or will be displayed to the user via the web browser. The displayed web page may include a visual indication of each occurrence of the search term within the web page.

18 Claims, 6 Drawing Sheets

Related U.S. Application Data continuation of application No. 13/466,967, filed on May 8, 2012, now Pat. No. 8,433,719.

(60) Provisional application No. 61/581,588, filed on Dec. 29, 2011.

(51) Int. Cl.
   *G06F 16/242* (2019.01)
   *G06F 16/957* (2019.01)
   *G06F 16/958* (2019.01)
   *G06F 40/14* (2020.01)
   *G06F 3/0482* (2013.01)

(52) U.S. Cl.
   CPC ........ *G06F 16/2428* (2019.01); *G06F 16/957* (2019.01); *G06F 16/958* (2019.01); *G06F 40/14* (2020.01)

(56) References Cited

U.S. PATENT DOCUMENTS

| | | | |
|---|---|---|---|
| 5,852,810 A | 12/1998 | Sotiroff et al. | |
| 5,864,871 A | 1/1999 | Kitain et al. | |
| 5,890,171 A | 3/1999 | Blumer et al. | |
| 5,905,862 A | 5/1999 | Hoekstra | |
| 6,006,225 A * | 12/1999 | Bowman | G06F 16/3325 |
| 6,009,459 A | 12/1999 | Belfiore et al. | |
| 6,055,538 A | 4/2000 | Kessenich et al. | |
| 6,092,074 A | 7/2000 | Rodkin et al. | |
| 6,094,649 A | 7/2000 | Bowen et al. | |
| 6,098,081 A | 8/2000 | Heidorn et al. | |
| 6,112,202 A | 8/2000 | Kleinberg | |
| 6,125,361 A | 9/2000 | Chakrabarti et al. | |
| 6,134,532 A | 10/2000 | Lazarus et al. | |
| 6,185,567 B1 | 2/2001 | Ratnaraj et al. | |
| 6,202,087 B1 | 3/2001 | Gadish | |
| 6,209,036 B1 | 3/2001 | Aldred et al. | |
| 6,212,522 B1 | 4/2001 | Himmel et al. | |
| 6,341,316 B1 * | 1/2002 | Kloba | H04L 29/06 709/248 |
| 6,549,941 B1 | 4/2003 | Jaquith et al. | |
| 6,772,150 B1 * | 8/2004 | Whitman | G06F 16/24534 707/721 |
| 6,779,042 B1 * | 8/2004 | Kloba | H04L 29/06 709/248 |
| 6,925,608 B1 | 8/2005 | Neale et al. | |
| 7,424,486 B2 * | 9/2008 | Whitman | G06F 16/24534 |
| 7,552,395 B2 | 6/2009 | Neale et al. | |
| 7,617,209 B2 * | 11/2009 | Whitman | G06F 16/24534 |
| 7,831,581 B1 * | 11/2010 | Emigh | G06F 16/353 707/706 |
| 7,890,526 B1 * | 2/2011 | Brewer | G06F 16/3322 707/767 |
| 8,135,729 B2 * | 3/2012 | Brewer | G06F 16/3322 707/767 |
| 8,140,563 B2 | 3/2012 | Midgley | |
| 8,156,109 B2 * | 4/2012 | Kamvar | G06F 16/3325 707/713 |
| 8,156,128 B2 * | 4/2012 | Ramer | G06Q 30/02 705/14.53 |
| 8,209,313 B2 * | 6/2012 | Wessling | G06F 16/217 707/706 |
| 8,433,719 B1 * | 4/2013 | Choc | G06F 16/957 707/768 |
| 8,572,129 B1 * | 10/2013 | Lee | G06F 16/95 707/798 |
| 8,949,254 B1 * | 2/2015 | De Datta | G06F 16/93 707/751 |
| 9,015,148 B2 * | 4/2015 | White | G06F 16/3322 707/721 |
| 9,262,482 B2 * | 2/2016 | Rubinstein | G06Q 50/01 |
| 9,652,494 B2 | 5/2017 | Choc | |
| 2002/0143860 A1 * | 10/2002 | Catan | G06K 17/0022 709/203 |
| 2003/0055816 A1 * | 3/2003 | Paine | G06Q 30/02 |
| 2004/0205558 A1 * | 10/2004 | Holloway | G06F 16/9577 715/230 |
| 2004/0236736 A1 * | 11/2004 | Whitman | G06F 16/24534 |
| 2005/0192953 A1 | 9/2005 | Neale et al. | |
| 2006/0031205 A1 * | 2/2006 | Perkins | G06F 16/9566 |
| 2006/0075120 A1 * | 4/2006 | Smit | G06F 16/951 709/227 |
| 2007/0025606 A1 * | 2/2007 | Gholap | G06F 16/58 382/128 |
| 2007/0038615 A1 * | 2/2007 | Vadon | G06F 16/3322 |
| 2007/0206221 A1 * | 9/2007 | Wyler | G06F 16/9577 358/1.15 |
| 2007/0239671 A1 * | 10/2007 | Whitman | G06F 16/24534 |
| 2008/0071773 A1 * | 3/2008 | Gross | G06F 16/951 |
| 2008/0256040 A1 * | 10/2008 | Sundaresan | G06F 16/00 |
| 2009/0106234 A1 * | 4/2009 | Siedlecki | G06Q 30/0276 |
| 2009/0210388 A1 * | 8/2009 | Elson | G06F 16/29 |
| 2009/0228481 A1 | 9/2009 | Neale et al. | |
| 2010/0057936 A1 | 3/2010 | Roskind | |
| 2010/0161594 A1 * | 6/2010 | Prasad | G06F 16/90335 707/722 |
| 2010/0191739 A1 * | 7/2010 | Wessling | G06F 16/217 707/748 |
| 2010/0262780 A1 * | 10/2010 | Mahan | G06F 15/16 711/118 |
| 2011/0055250 A1 * | 3/2011 | Nandy | G06F 16/248 707/769 |
| 2011/0072033 A1 * | 3/2011 | White | G06F 16/3322 707/768 |
| 2011/0178973 A1 * | 7/2011 | Lopez | G06F 40/166 706/48 |
| 2011/0184936 A1 * | 7/2011 | Lymberopoulos | G06F 16/9574 707/721 |
| 2011/0208707 A1 * | 8/2011 | Monga | G06F 16/38 707/706 |
| 2011/0219295 A1 * | 9/2011 | Adams | G06F 17/00 715/234 |
| 2011/0314021 A1 * | 12/2011 | Gibbs | G06F 16/3322 707/737 |
| 2012/0136886 A1 * | 5/2012 | Brewer | G06F 16/3322 707/767 |
| 2012/0150902 A1 | 6/2012 | Midgley | |
| 2012/0239696 A1 * | 9/2012 | Wessling | G06F 16/217 707/780 |
| 2013/0031091 A1 * | 1/2013 | El Daher | G06F 16/957 707/723 |
| 2014/0040243 A1 * | 2/2014 | Rubinstein | G06Q 50/01 707/722 |
| 2014/0040244 A1 * | 2/2014 | Rubinstein | G06Q 50/01 707/722 |
| 2014/0040245 A1 * | 2/2014 | Rubinstein | G06Q 50/01 707/722 |
| 2014/0040246 A1 * | 2/2014 | Rubinstein | G06Q 50/01 707/722 |
| 2014/0040285 A1 * | 2/2014 | Rubinstein | G06Q 50/01 707/751 |
| 2014/0344265 A1 * | 11/2014 | Boucher | G06Q 50/01 707/732 |

OTHER PUBLICATIONS

C. Ilias, "Search your bookmarks, history and tabs with the Awesome Bar," Jan. 14, 2010, <http//www.support.mozilla.org>, visited Dec. 4, 2012.

J. Newman "Atomic Web: A Better iPad Browser," Apr. 18, 2010, <http://www.pcworld.com/article/194488/Atom Web Browser. html>, visited Dec. 4, 2012.

Loizides, Fernando, et al, "The Myth of Find: User Behavious and Attitudes Towards the Basic Search Feature," JCDL '08, Jun. 16-20, 2008, pp. 1-4.

Pearson, Jennifer, et al., "Creating Visualisation for Digital Document Indexing," ECDL 2009, Springer-Verlag, pp. 87-93, 2009.

(56) References Cited

OTHER PUBLICATIONS

R. Ritchie, "iOS 4.2 features: Find text on Safari web page," Sep. 16, 2010, <http://www.imore.com/ios-4-features-find-text-safari-web-page>, visited Dec. 3, 2012.
Prosecution History from U.S. Appl. No. 13/466,967, dated Aug. 1, 2012 through Dec. 28, 2012, 52 pp.
Prosecution History from U.S. Appl. No. 13/857,931, dated Feb. 27, 2015 through Jan. 11, 2017 154 pp.

* cited by examiner

ACCELERATING FIND IN PAGE QUERIES WITHIN A WEB BROWSER

RELATED APPLICATIONS

The present application is a continuation of U.S. patent application Ser. No. 13/857,931, filed Apr. 5, 2013, entitled "ACCELERATING FIND IN PAGE QUERIES WITHIN A WEB BROWSER" which is a continuation of U.S. patent application Ser. No. 13/466,967, filed on May 8, 2012, entitled "ACCELERATING FIND IN PAGE QUERIES WITHIN A WEB BROWSER", now issued as U.S. Pat. No. 8,433,719, which claims priority benefit under 35 U.S.C. § 119(e) from U.S. Provisional Application No. 61/581,588, filed Dec. 29, 2011, entitled "ACCELERATING FIND IN PAGE QUERIES WITHIN A WEB BROWSER" all of which are herein incorporated by reference in their entirety.

BACKGROUND

The present disclosure relates generally to web browsers, and, more particularly, to performing a search query within a web browser.

Modern web browsers, for both desktop and mobile computing platforms, allow users to initiate web searches for items of information associated with web pages based on one or more search terms input by the user into a search field of the browser. Such browsers also allow users to navigate directly to a web page by, for example, entering a web address, or uniform resource locator (URL), associated with the particular web page into an address field of the browser.

SUMMARY

Various aspects of the subject technology relate to a method of performing a search query within a web page. The method may include receiving a search term via a search field of a web browser displaying a web page comprising web page data, generating at least two search query options based on the search term, wherein the at least two search query options comprise performing a web search of the search term and performing a search of the search term within the web page data, and displaying, in response to receiving the search term, the at least two search query options within a drop-down list control element associated with the search field of the web browser. The method may further include generating, based on the search term, at least one prediction of a search query option, dynamically updating the drop-down list control element to include a predicted search option based on the at least one prediction, receiving a selection of the search query option to perform the search of the search term within the web page data, and identifying, based on the selection of the search query option to perform the search of the search term within the web page data, one or more occurrences of the search term within the web page data.

Aspects of the subject technology also relate to a system for performing a search query within a web page. The system may include one or more processors and a machine-readable medium comprising instructions stored therein, which when executed by the processors, cause the processors to perform operations. The operations may include acquiring a search term via a search field of a web browser displaying a web page comprising web page data, generating at least two search query options based on the acquired search term, and displaying, in response to receiving the search term, the at least two search query options, wherein the at least two search query options comprise performing a web search of the search term and performing a search of the search term within the web page data. The operations may also include generating, based on the search term, at least one prediction of a search query option to be displayed, dynamically updating the at least two search query options being displayed based on the at least one prediction, and identifying, in response to receiving a selection of the search query option to perform a search of the search term within the web page data, one or more occurrences of the search term within the web page data.

The disclosed aspects further relate to a non-transitory machine-readable medium comprising instructions stored therein, which when executed by a processor, causes the processor to perform operations. The operations may include acquiring a search term via a search field of a web browser displaying a web page comprising web page data, displaying, responsive to the acquired user input, a first search query option as an entry within a drop-down list control element in association with the search field of the web browser, wherein the first search query option is for performing a search of the search term within the web page data, performing a search for additional web page data related to at least a portion of the search term being input by the user into the search field, displaying additional search query options based on results of the performed search, the additional search query options being displayed as additional entries within the drop-down list control element, responsive to the user's selection of the first search query option, performing a text-based search for the search term within the web page data, and displaying the web page data in a content area of the web browser, wherein the displayed web page data identifies at least one occurrence of the search term within the web page.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The disclosed subject matter relates to providing an accelerated search query option for a find in page feature within a web browser. Such a "find in page" feature may be invoked by a user of a desktop browser by, for example, pressing a particular key combination or keyboard shortcut (e.g., "Ctrl+F"). However, conventional browsers fail to provide users with a quick and easy way to perform searches for terms located within a web page itself. Further, many users are unaware of the find in page search capability of web browsers, particularly with respect to mobile browsers. This primarily may be due to the fact that such a feature typically is not presented in the browser in a way that would make it apparent to users.

Hence, the above-noted accelerated search query option provided for find in page may include extending the functionality of a search field within the web browser to include a user-selectable accelerator option to invoke find in page. For example, an accelerator soft key or other graphical control may be added to a search field in the web browser to enable find in page functionality of the browser. Accordingly, this capability would allow the user to not only search for items and web pages over the web based on a search term entered into a search field of the browser, but also to search for the term itself in a web page the user is either currently viewing or will be viewing relatively soon. The search term may be a portion (e.g., one or more characters) of a search string relating to the web page data loaded within browser. This capability is particularly useful in the context of mobile browsers, since, unlike desktop browsers, users of mobile browsers cannot take advantage of any keyboard accelerators or shortcuts to quickly find search terms located within the data of a web page using a mobile browser. Moreover, such functionality is typically hidden behind several menus of the mobile browser.

The terms "web page data" and "web page content" are used herein to refer to any data or resource that can be provided over a network including, e.g., the Internet or World Wide Web (or "the web"), and be loaded into a web browser. For example, such data or resource may be identified by a resource location address, for example, in a Uniform Resource Locator (URL) and/or Uniform Resource Identifier (URI), that is associated with the resource. Further, web page data may include different types of resources, for example and without limitation, Hypertext Markup Language (HTML) or other markup language elements, text, images, video and other media content, and embedded information (e.g., meta-data and hyperlinks) and/or embedded JavaScript or other scripting language elements.

Figure 1:
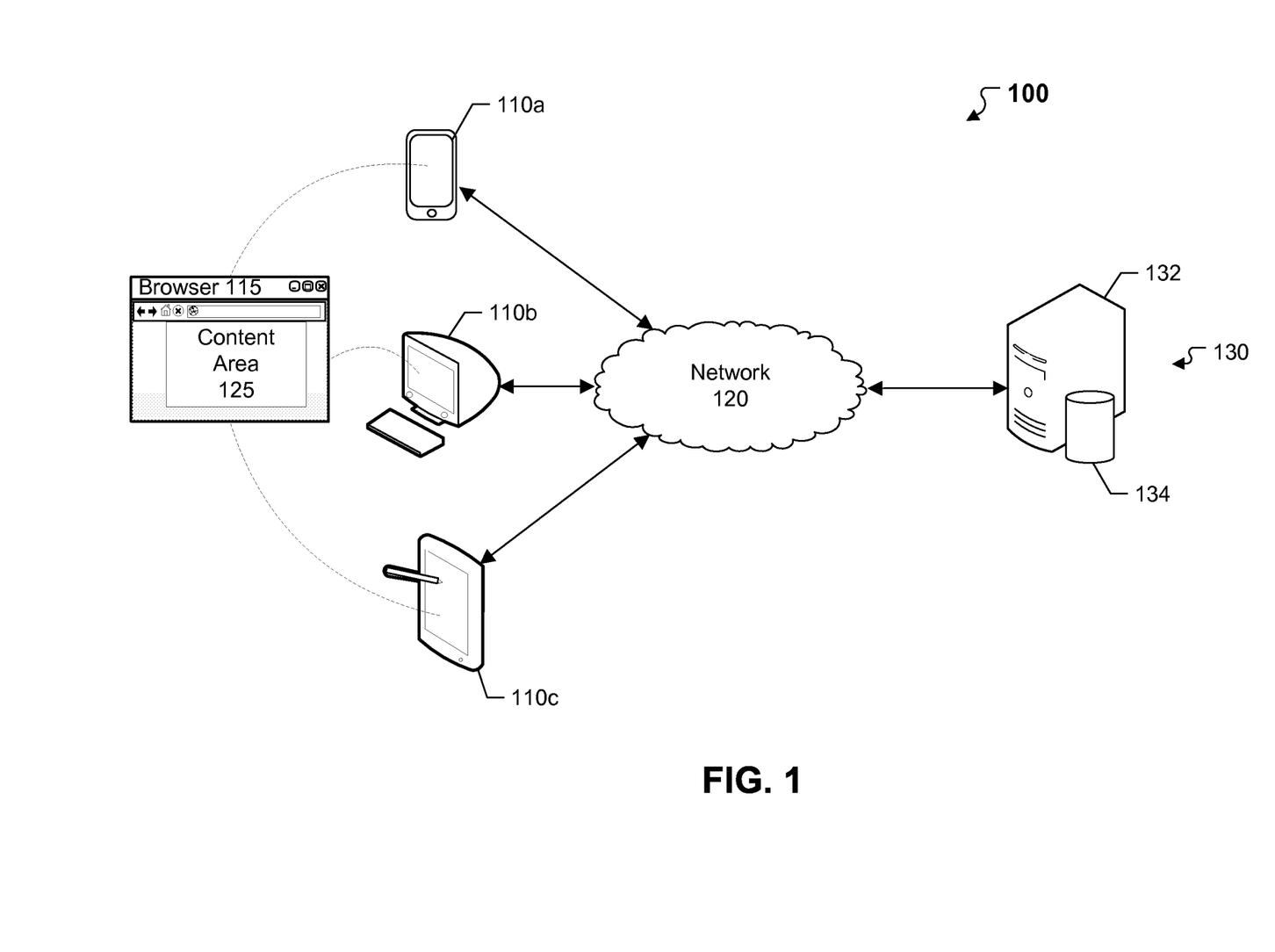
FIG. 1 is a diagram of an example network environment suitable for practicing an implementation of the subject technology.

FIG. 1 illustrates an example network environment 100 suitable for practicing an implementation of the subject technology. Network environment 100 includes client devices 110a, 110b and 110c (hereinafter "clients 110a-c"), and a computing system 130. Clients 110a-c communicate with one or more servers 132 of computing system 130, for example, through network 120. As shown in FIG. 1, computing system 130 includes at least one server device 132 and at least one computer-readable storage device or database 134. Although only server 132 and database 134 are shown, additional servers and/or databases may be used as may be necessary or desired for a particular implementation. Further, server(s) 132 are communicatively coupled to database(s) 134. Database 134 may store any type of data accessible by server(s) 132. Such data may include web page data or content corresponding to one or more web pages, as described above.

In an example, each of clients 110a-c communicates with server(s) 132 over network 120. Clients 110a-c can be can be any type of computing device with at least one processor, local memory, display, and one or more input devices (e.g., a mouse, QWERTY keyboard, touch-screen, microphone, or a T9 keyboard). Examples of different computing devices that may be used to implement any of clients 110a-c include, but are not limited to, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Alternatively, each of clients 110a-c can be a specialized computing device such as, for example, a mobile handset or tablet computer. Similarly, server 132 can be implemented using any general-purpose computer capable of serving data to any of clients 110a-c. Examples of computing devices that may be used to implement server 132 include, but are not limited to, a web server, an application server, a proxy server, a network server, or a group of computing devices in a server farm.

In some aspects, network environment 100 can be a distributed client/server system that spans one or more networks such as network 120. Network 120 can be any network or combination of networks that can carry data communication. Such a network can include, but is not limited to, a cellular network, a local area network, medium area network, and/or wide area network such as the Internet, or a combination thereof for communicatively coupling any number of mobile clients, fixed clients, and servers. In some aspects, each of clients 110a-c can communicate with server 132 via a virtual private network (VPN), Secure Shell (SSH) tunnel, or other secure network connection. In some aspects, network 120 may further include a corporate network (e.g., intranet) and one or more wireless access points.

As shown in FIG. 1, each of clients 110a-c executes a browser 115. For example, clients 110a-c may execute different implementations of browser 115, where each implementation is targeted to a particular computing platform associated with a respective client device. Further, browser 115 can be any type of web browser or similar application. For example, browser 115 may request web pages associated with computing system 130. Further, computing system 130 may be associated with a third-party publisher or provider of web content to be included within web pages using one or more browser-supported programming languages including, but not limited to, JavaScript, VBScript, HTML, or other type of language for writing web pages.

In an example, each of clients 110a-c communicates with server(s) 132 over network 120 to retrieve web page data or content (e.g., stored in database(s) 134) to be loaded into browser 115. Browser 115 requests one or more web pages from server(s) 132 over network 120 using one or more standard communication protocols including, for example, Hypertext Transfer Protocol (HTTP). In an example, server 132 returns the web pages in response to the request(s) from browser 115. In an embodiment, browser 115 decodes the HTML and/or other markup or scripting language in which the web page is encoded. For example, the HTML code of the web page may specify a location or source of third-party content, which may be a web resource (e.g., a separate web page, text or graphical object) that is to be embedded within the web page as it is rendered in a window of browser 115.

The web page content is displayed by browser 115 in a content display area 125 of browser 115. The web page is viewed by the user via a display or rendering device coupled to clients 110a-c. Such a display or rendering device can include, but is not limited to, a touch-screen display, a cathode ray tube (CRT) monitor, light-emitting diode (LED) display or liquid crystal display (LCD) screen. The user can also interact with browser 115 to perform various tasks including, for example, directing browser 115 to different web pages. Browser 115 receives user input from one or more input devices (not shown), such as, for example, a mouse, keyboard, or touch screen coupled to client devices 110a-c. Browser 115 may enable the user to initiate web searches for content items of interest associated with web pages based on one or more search terms input by the user into a search field of the browser. Browser 115 may also allow the user to navigate directly to a web page by entering a location address, e.g., a uniform resource locator (URL), associated with the particular web page into an address field.

As noted previously and as will be described in further detail below, browser 115 may include a find in page feature that enables the user to initiate search requests for items of information associated with web page data loaded therein. The search requests may be based on one or more search terms input by the user into a search field of browser 115. The search field may be implemented using a single search box that combines the functionality of multiple search fields, such as those described above. For example, the above-described search field and the address field of browser 115 may be combined into a single search field that allows the user to enter both a web page address for navigating to a particular web page or a search term for querying items on the web. Alternatively, any appropriate search field of browser 115 can be adapted to include the find in page functionality, as described herein. Thus, the find in page functionality may be incorporated into browser 115 using either the address field or the search field for performing general web searches, as described above.

Figure 2:
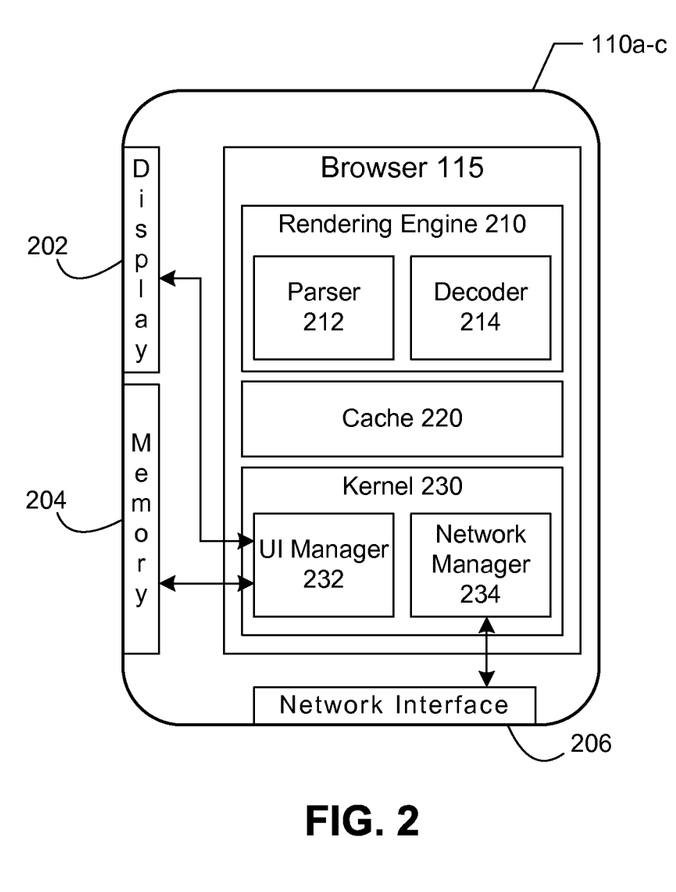
FIG. 2 illustrates an example client device including a web browser for implementing an accelerated search query option to find terms within web page data loaded in the web browser.

FIG. 2 is a functional block diagram showing portions of a computing device representing any of client devices 110a-c (hereinafter "client 110a-c") and browser 115 of network environment 100 of FIG. 1, as described above. As shown in the example of FIG. 2, browser 115 includes a rendering engine 210, a cache 220 and a kernel 230. Rendering engine 210 includes a parser 212 and a decoder 214. Kernel 230 includes a user interface (UI) manager 232 and a network manager 234. For example, client device 110a-c may be either a mobile device (e.g., mobile phone or tablet computing device) or a desktop computing device, as described above. In addition to browser 115, client 110a-c includes a display 202, a memory 204 and a network interface 206. Although not shown in FIG. 2, client 110a-c may include additional components for implementing an accelerated search query option with the find in page functionality, as described herein. These other components and data are not shown in FIG. 2 for ease of explanation and purposes of discussion. Further, for ease of explanation, browser 115 and its components, including rendering engine 210, parser 212, decoder 214, cache 220, kernel 230, UI manager 232 and network manager 234, are described using network environment 100 of FIG. 1, but are not intended to be limited thereto.

In an example, rendering engine 210 processes web page data from a web server (e.g., server 132 of FIG. 1, as described above). As described above, the received web page data may include various types of web content including, for example, HTML and other markup or scripting language (e.g., JavaScript) elements along with text, images, video or other media content associated with the web page to be displayed. In some implementations, rendering engine 210 may operate in a sandbox environment that restricts rendering engine 210's access to the operating system of client 110a-c, thereby mitigating any potential security vulnerabilities associated with the execution of third-party web page content from unknown sources. Hence, kernel 230 may provide an operating interface for rendering engine 210 to use for issuing network requests via network interface 206, accessing data stored in memory 204 or other persistent storage device communicatively coupled to client 110a-c, and for displaying web page content to the user via display 202.

Further, the web page data may be initially received at network manager 234 of kernel 230 via network interface 206 of client 110a-c. Network manager 234 may be configured to transfer the web page data to rendering engine 210 for processing and displaying the data as a web page to a user via display 202. Cache 220 may be used by rendering engine 210 and its components (e.g., parser 212 and decoder 214) and kernel 230 and its components (e.g., UI manager 232 and network manager 234) for storing and transferring information between each other. Cache 220 may also be used to store web resources associated with a web page whose location is specified by a URL. Cache 220 may be any temporary or persistent storage location at client 110a-c that is accessible to browser 115.

In an example, rendering engine 210 uses parser 212 to parse HTML and other code associated with the web page, as described above. Parser 212 may parse each element in the HTML code, for example, by parsing or interpreting each tag within the code. In addition, rendering engine 210 may use decoder 214 to decode images or other media content within the web page data. Parser 212 and decoder 214 can then direct rendering engine 210 to generate a web page including text and/or image objects to be displayed to the user at client 110a-c. For example, UI manager 232 of kernel 230 may display the text and image objects of the web page generated by rendering engine 210 within a content area or user interface window of browser 115 via display 202. Further, UI manager 232 may be configured to receive input from the user in association with the content area or user interface window from the user via a user input device (e.g., touch-screen or keyboard device) at client 110a-c, as described above. In some implementations, the received user input may be stored in a temporary character buffer or other type of input buffer in memory 204. Alternatively, the user input may be received directly at kernel 230, e.g., at UI manager 232. The input received from the user may also include one or more characters of a search term entered by the user into a search field of browser 115, as will be described in further detail below with respect to the example browser interfaces illustrated in FIGS. 3A-3B and FIG. 4.

Figure 3A:
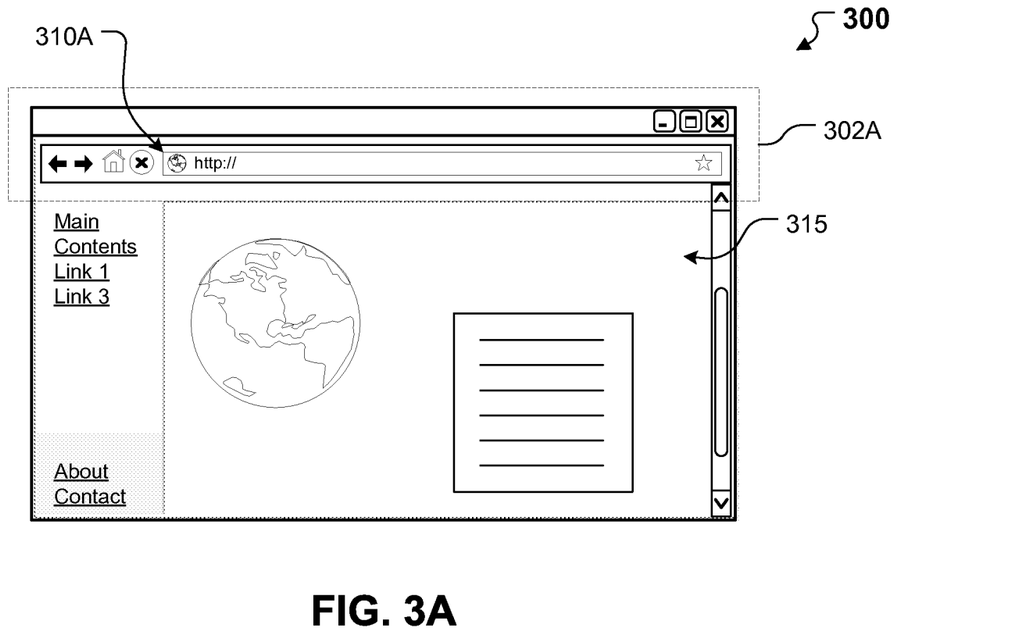
FIG. 3A illustrates an example graphical user interface of a web browser for enabling a user to initiate search queries within the browser.

FIG. 3A illustrates an example graphical user interface (GUI) 300 of a web browser, for example, browser 115 of FIGS. 1 and 2, as described above. For example, GUI 300 may be provided in an implementation of browser 115 for a desktop computing platform or device (e.g., client device 110b of FIG. 1, as described above). However, GUI 300 is not intended to be limited thereto. As shown in FIG. 3A, a portion 302A of GUI 300 includes a web page address field 310A that enables a user at the computing device to enter a location address (e.g., URL) corresponding to a web page to be loaded within the browser. The user may enter the location address of a particular web page using one or more user input devices of the computing device (e.g., a mouse for selecting inside the field and a keyboard for entering text characters). In some implementations, the web browser may provide a separate search field (not shown) that is dedicated to performing these search queries. Additionally or alternatively, address field 310A may also function as a search field. For example, field 310A may be implemented as a single or unified search box that combines the functionality of multiple search fields, as described above. Thus, in addition to inputting web addresses for navigating to web pages, the user may initiate web searches based on at least a portion of a search term entered by the user into field 310A.

Web page content or data loaded within the browser (e.g., within cache 220 of browser 115, as shown in FIG. 2 and described above) may be displayed in a content area 315. The user may interact with the content displayed in content area 315 using a user input device, as described above. Also, as shown in FIG. 3A, GUI 300 may include various other user control elements including, for example, navigation controls for the user to navigate between different web pages to be loaded and displayed within content area 315.

In an implementation of field 310A, e.g., either as a dedicated web address field or as a unified search field, as described above, field 310A also may provide find in page functionality that enables the user to initiate a search query for finding any occurrence of a search term within the web page content displayed within content area 315. Alternatively, any appropriate search field (not shown) of the web browser may be adapted to include such find in page functionality. For example, the find in page functionality may be implemented in either the address field 310A or the above-noted separate search field of web browser for performing web searches.

Figure 3B:
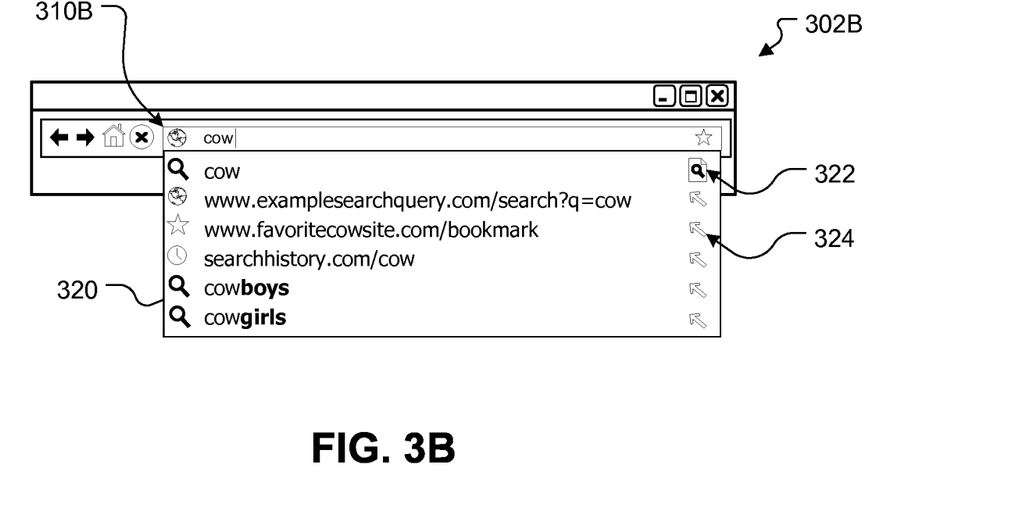
FIG. 3B illustrates an example drop-down list control element associated with a search field of the example graphical user interface of the web browser in FIG. 3A.

Upon the user's entry of each character of a search string into a search filed 310A, the user may be presented with one or more search query options 320, as shown by portion 302B in FIG. 3B. In the example illustrated in FIG. 3B, portion 302B represents a version of portion 302A including search query options 320 that are displayed as different entries or items in a pop-up or drop-down list control element in association with the address/search field 310B. Further, each of the search query options 320 includes a graphical component for invoking different types of search queries based on the portion of the search term or characters input by the user into field 310B. The graphical component may be in the form of a user-selectable control represented by a graphical icon, e.g., icons 322 and 324. As will be described in further detail below, the user may initiate each of the different types search queries that are presented in the list of search query options 320 by selecting the graphical component associated with the respective search query option.

Figure 4:
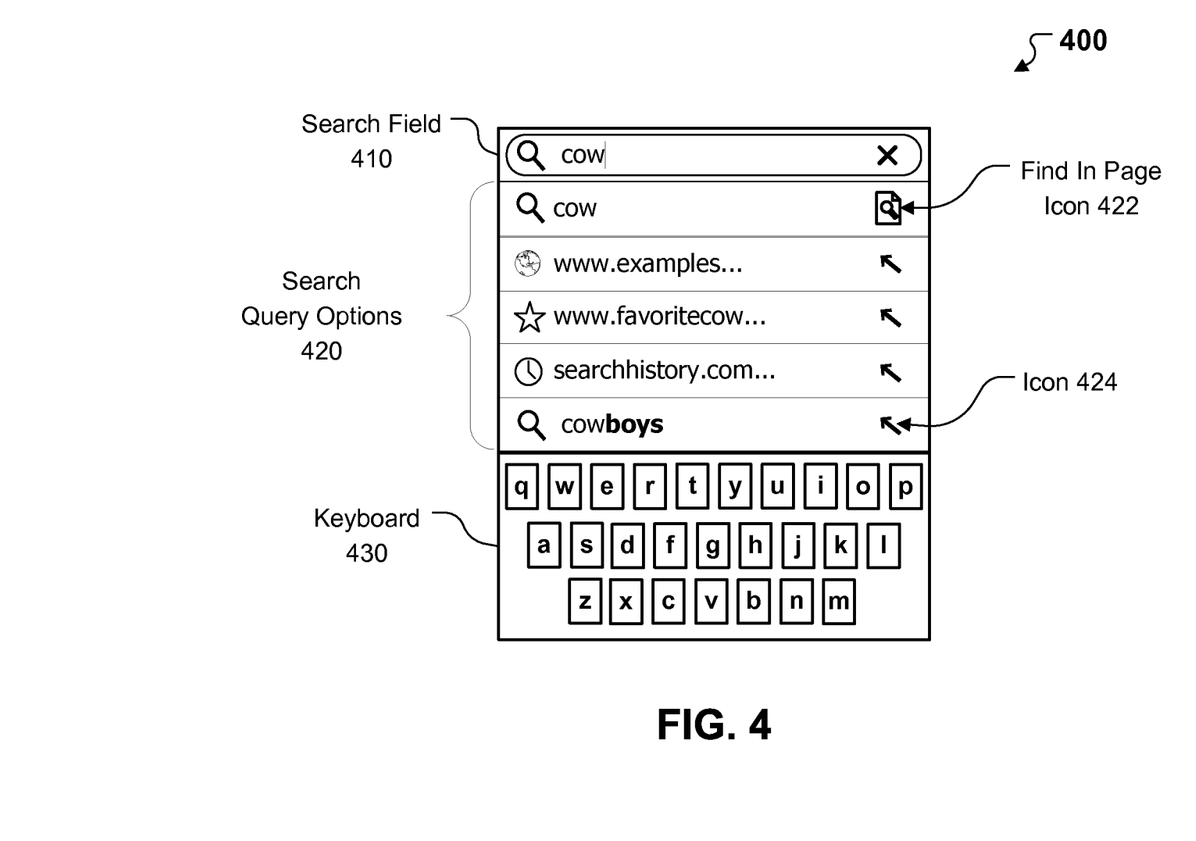
FIG. 4 illustrates another example graphical user interface of a web browser enabling a user to initiate search queries within the browser.

FIG. 4 illustrates another example GUI 400 of a web browser (e.g., browser 115 of FIGS. 1 and 2, as described above) for enabling a user to initiate a search query within the browser. Like GUI 300 of FIGS. 3A and 3B, described above, GUI 400 may be used to provide a search query option to implement the find in page feature of the browser. The example GUI 400 illustrated in FIG. 4 may be provided in an implementation of browser 115 for a mobile computing platform or device (e.g., client device 110a or 110c of FIG. 1, as described above). However, GUI 400 is not intended to be limited thereto. As described above, the find in page functionality may be incorporated into any appropriate search field of the web browser executing at the mobile device for enabling the user to search for one or more terms that may appear on a web page displayed within a content area of the mobile browser.

As shown in FIG. 4, GUI 400 includes a search field 410 that enables a user to enter at least a portion of a search term. In an example, search field 410 may be implemented as a single or unified search box that combines the functionality of multiple search fields, as described above. Thus, the user may use search field 410 to initiate a web search based on a search term entered by the user into search field 410. Alternatively, the user may enter a location address (e.g., URL) of a particular web page in order to navigate to the web page. It should be noted that while only search field 410 is shown in FIG. 4, a different search field provided by the web browser may be adapted to include the find in page functionality, as described herein. For example, the find in page functionality may be implemented in either the address field or the standard web page search field of a conventional or other web browser.

The user may use keyboard 430 to input a search term (e.g., one or more characters in a string of text) into search field 410. For example, keyboard 430 may be a physical keyboard coupled to the user's device. Alternatively, keyboard 430 may be implemented in software as a soft keyboard for a touch-screen display of the device. In response to each character of the search term entered into search filed 410, the user may be presented with one or more search query options 420. As shown in FIG. 4, search query options 420 may be displayed as different entries or items in a drop-down list box element or pop-up list associated with search field 410. Further, each of the search query options 420 may include a graphical component for invoking a different type of search query using the search term or characters input by the user into search field 410. The graphical component may be in the form of a user-selectable control represented by a graphical icon, e.g., icons 422 and 424.

As shown in the example GUI 400 of FIG. 4, the search query option and the graphical component for selecting the search query option may be displayed as a first entry within a drop-down list control element associated with search field 410 (or other search field of the web browser). Alternatively, the search query option for find in page and the graphical component for selecting the search query option may be displayed within search field 410 itself.

Further, the user-selectable graphical component of the search query option for invoking the find in page functionality of the browser may be represented by a find in page icon 422. The user's selection of find in page icon 422 via a user input device (e.g., touch-screen) coupled to the user's device (e.g., client 110a of FIG. 2, as described above), may cause the browser (e.g., browser 115) executing at the device to perform a text-based search related to the selected query option using the web page data loaded in the browser (e.g., stored within cache 220 of FIG. 2). The web page data may correspond to content for a web page that is currently being displayed to the user at the device (e.g., via display 202 of FIG. 2) or to content for one or more other web pages that are yet to be displayed.

In addition to a search query option for find in page, additional options search queries may be performed for additional web page data corresponding to one or more related web pages based on the search term input by the user into search field 410. Thus, search query options 420 may include, for example, an option to perform a general web search for one or more related web pages. In addition, search query options 420 may include an option to identify related search activity of the user based on a browsing history stored for the web browser at the client device. The stored browsing history may include, for example, a list of web sites that the user has previously visited using the web browser at the device. The list may include information identifying each web site and the associated user activity including, for example, a name or location (e.g., URL) of each web site along with a timestamp corresponding to the last time the user visited the web site via the browser. In a further example, a search query option for related web page data may correspond to a set or list of web sites that have been previously designated by the user as being favorites or sites that have been bookmarked by the user to visit again at a later time.

Referring back to FIG. 2, UI manager 232 of browser 115 may be configured to manage interactions between the user and the user interface elements or controls of GUI 300 or GUI 400. Thus, UI manager 232 may be configured to receive input from the user based on the user's interaction with the various user control elements, field 310A/B, content area 315 and/or search query options 320 of GUI 300, as shown in FIGS. 3A and 3B and described above. Similarly, UI manager 232 may be configured to receive input from the user based on the user's interactions with GUI 400 including, for example, search field 410, search query options 420, and keyboard 430. Further, UI manager 232 may receive input related to the performance of a search query option based on the user's selection of find in page icon 422, icon 424 or any other icon or graphical component associated with any of the listed search query options 420.

With reference to GUI 400 of FIG. 4, the input received by UI manager 232 may include a search term entered by the user into search field 410. As noted previously, the search term may be a portion (e.g., one or more characters) of a search string relating to the web page data loaded within browser 115. Upon receiving the user input, UI manager 232 may display various search query options 420 with a user-selectable graphical component for selecting each option, as described above. The search query options may be generated by, for example, parser 212 or decoder 214 of rendering engine 210 and transferred to UI manager 232 for display. For example, parser 212 may generate search query options based on the search term input by the user via search field 410 of GUI 400, which may have been acquired by UI manager 232 and transferred to parser 212 for processing, as described above.

In response to the user's selection of the graphical component corresponding to the search query option to find in page (e.g., find in page icon 422 of FIG. 4, as described above), UI manager 232 may be configured to pass the search term entered by the user within search field 410 to the rendering engine 210. As noted previously, the search term and other information may be shared between kernel 230 and its components, including UI manager 232, and rendering engine 210 and its components via cache 220. Alternatively, such information may be shared directly between kernel 230 and rendering engine 210 and their respective components without using cache 220.

Rendering engine 210 may then invoke parser 212 to perform a search (e.g., a text-based search) for the search term or portion of the search string within the web page data. For example, parser 212 may be configured to parse the contents of web page data in order to find any text appearing on the web page either as displayed or to be displayed in a content area (e.g., content area 315 of GUI 300 of FIG. 3A, as described above) of browser 115. Similarly, rendering engine 210 may invoke decoder 214 to find user-searchable content related to the user-entered search term within the web page data. Such other user-searchable content may include, for example, text or code embedded within images or other graphical content displayed or that will be displayed within browser 115. Based on the data parsed by parser 212, rendering engine 210 may display the web page data or update already displayed web page data so as to identify at least one occurrence of the search term or portion of search string within the web page as it is displayed within browser 115. Rendering engine may use any of various graphical or other techniques to visually indicate to the user the occurrence(s) of the search term on the displayed web page. Examples of such techniques may include, but are not limited to, highlighting the text corresponding to the search term using different colors, font sizes or various other types of formatting.

Rendering engine 210 (e.g., parser 212) may also be configured to perform a search for additional web page data related to at least a portion of the search string being input by the user within the search field. As described above, the additional web page data may be associated with, for example and without limitation, the user's previous search activity or browsing history, or user-favored web pages that have been previously specified by the user via the web browser. The user's browsing history or the user-favored web pages bookmarked by the user may be stored either locally at client device 110a-c or in a remote storage location (e.g., cloud storage location) associated with the user (or an account registered by the user with a cloud service provider). The remote storage location may be accessible to browser 115 across a network (e.g., network 120 of FIG. 1, as described above). UI manager 232 may be configured to display additional search query options based on results of the search performed by, for example, parser 212 of rendering engine 210. As described above and illustrated by search query options 320 and 420 of GUIs 300 and 400, respectively, the additional search query options may be displayed as additional entries within a drop-down list control element in association with the search field of the web browser. The search query option to search within a web page may be displayed as a separate entry or combined with another one of the additional search query options displayed to the user, e.g., as illustrated by find in page icon 422 within the list of search query options 420 of GUI 400. Although find in page icon 422, as shown in the example GUI 400 of FIG. 4, is located at the right side of the first entry in search query options 420, find in page icon 422 or other graphical component for invoking find in page may be displayed at the left side or at any other portion of the first or other entry Further, each of the additional entries may include a user-selectable graphical component for selecting the respective search query option.

In addition to displaying search query options associated with the user's prior search or browsing history, search query options based on the cumulative search activities of other users may also be provided to the user. For example, parser 212 may utilize a prediction service for automatically predicting these additional search query options based on the search term input by the user and publicly available data associated with the search activities of other users. The prediction service and the other users' search activities may be provided, for example, by a provider of a search engine for performing web searches. Further, the predicted search queries may be algorithmically determined by the prediction service based on a number of objective factors (e.g., popularity of search terms) without any user intervention. The search data used by the prediction service may be updated frequently to provide up-to-date or relevant search queries.

Accordingly, the prediction service may be associated with an "auto-complete" feature of browser 115 that attempts to predict search queries of interest to the user (e.g., the search string being input by the user) based on the search history of the user and other users. The user may be able to enable or disable the browser's use of such a prediction service via, for example, a user setting or configuration panel of browser 115. As described above, the search term being input by the user into a search field of the browser 115 may be a portion (e.g., one or more characters) of search string. As the user inputs each character of the search string, the additional search query options may be displayed in real time within the drop-down list control element. UI manager 232 may be further configured to dynamically update in real time the entries being displayed within the drop-down list based on the additional search query options as predicted by the prediction service.

In a further example, browser 115 may use network manager 234 in kernel 230 to pre-fetch user-searchable content of a web page upon receiving a user request directing browser 115 to navigate to the web page (e.g., via address/search field 310A/B of FIGS. 3A and 3B or field 410 of FIG. 4, as described above). In this example, the search query options relating to a user-entered search term (e.g., within search field 410 of GUI 400 of FIG. 4) may be displayed only if or when the search term is found in the web page data (e.g., by parser 212) for the web page to be displayed. In some implementations, the user-searchable content may be pre-fetched by one or more web servers (e.g., server 132 of FIG. 1, as described above) over a network (e.g., network 120 of FIG. 1, as described above). The pre-fetched data may be stored at the server(s), e.g., in a database (e.g., database 134 of FIG. 1) communicatively coupled to the server(s), and sent to browser 115 via the network. Further, the pre-fetched data may be associated with an internal dictionary including, for example, popular search terms based on search trends or search activities of general users of a search engine, as described above. Accordingly, the internal dictionary may be maintained and frequently updated by the server system (e.g., system 130 of FIG. 1). Further, this data also may be made available for use by the prediction service utilized by browser 115, as described above. Additionally or alternatively, the internal dictionary may include terms appearing within one or more popular web pages or the web pages of interest to the user (e.g., as requested via the address or search field of browser 115, as noted above).

In addition to a search query option to find a search term from the user in a web page, it may be possible to extend the find in page functionality of browser 115 to include search query options to find the term or other content of interest to the user within third-party data sources accessible to browser 115. An example of such a third-party data source may include one or more third-party browser extensions that are stored locally at the client device 110a-c. Such a third-party browser extension may be any utility, application program, or service that extends the functionality of the browser 115. Further, the third-party browser extensions may have been previously downloaded by the user from a third-party service provider via a network (e.g., network 120 of FIG. 1) and installed at the client device 110a-c (e.g., within memory 204) in association with browser 115.

Another example of a third-party data source may include web page data, documents or other files associated with the user or client device 110a-c that are stored at a remote network location, e.g., at a cloud server or data store. The user may specify the network location of the cloud server or cloud-based data store using, for example, a settings panel of browser 115. Consequently, the additional search query options presented to the user may correspond to search queries based on the installed browser extensions or the specified network location of the cloud server or data store. In this way, the user is able to customize the search query options provided by browser 115 for finding items that may be of interest to the user.

Figure 5:
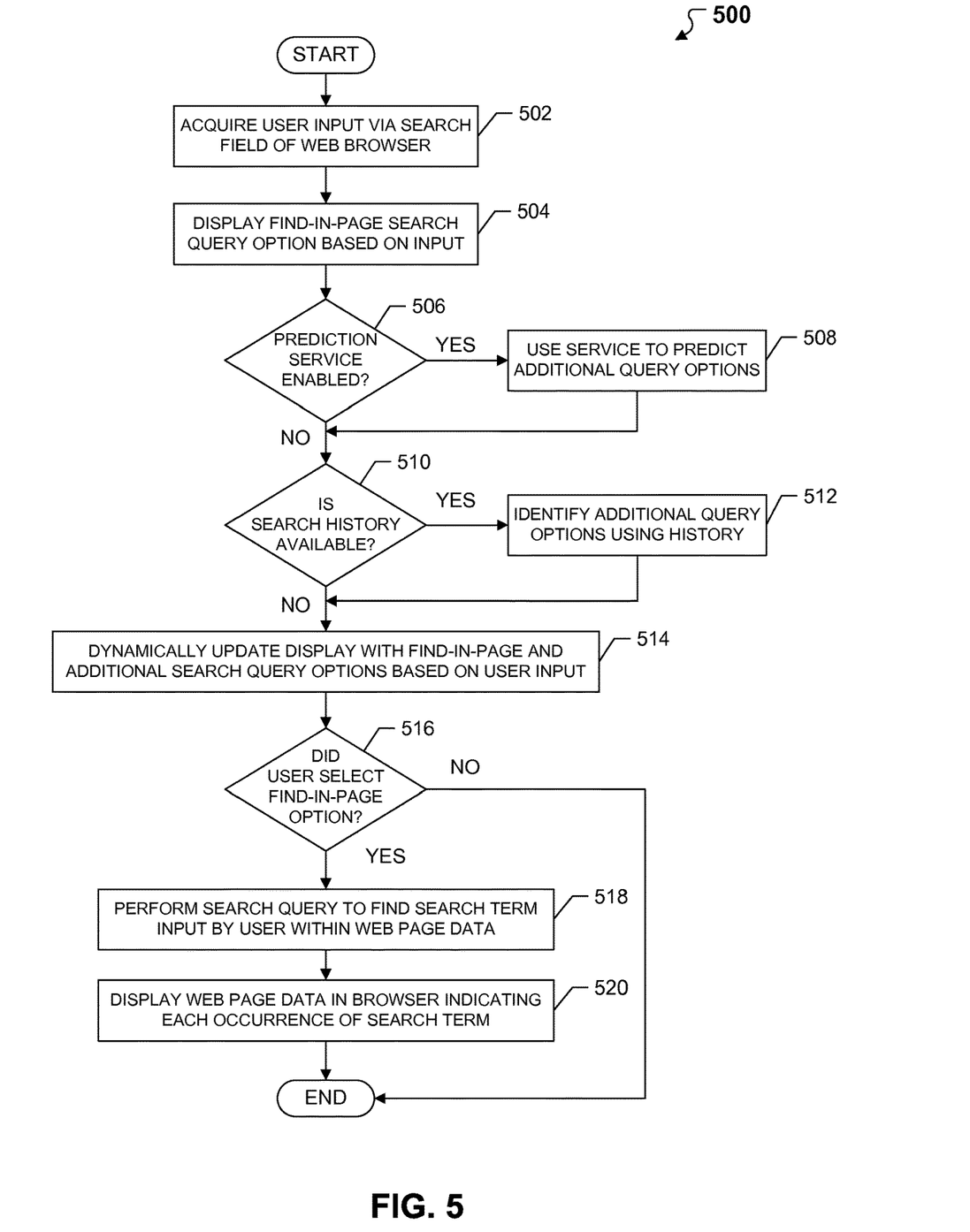
FIG. 5 is a process flow chart of an example method for performing a search query within a web browser.

FIG. 5 is a process flow chart of an example method 500 for performing a search query within a web browser. For ease of explanation, method 500 will be described with respect to network environment 100 of FIG. 1, as described above, and web browser 115 of FIGS. 1 and 2, as described above. However, method 500 is not intended to be limited thereto. Further, method 500 will be described with reference to GUI 400 of FIG. 4, as described above, but is not intended to be limited thereto.

Method 500 begins in step 502, which includes acquiring input from a user via a search field of a web browser (e.g., browser 115 of FIGS. 1 and 2, as described above) being executed at a client device (e.g., any of client devices 110a-c of FIG. 1, as described above) of the user. The web browser may have web page data for a web page loaded therein. As described above, the user input may include the entry of a search term or at least a portion of a search string relating to the web page data. In response to the acquired user input, method 500 proceeds to step 504, which includes displaying within the web browser a search query option for finding the portion of the search string input by the user within the web page loaded in the web browser. The search query option may be displayed in association with a user-selectable graphical component for selecting the search query option. The search query option may be displayed, for example, within the search field itself or as a first entry in a drop down list that is displayed in association with the search field.

In addition to the search query option for find in page, additional search query options may be displayed based on, for example, the user's personal search activities or browsing history associated with the web browser or the search activities associated with other users of a search engine. As described above, search query options based on other users' search activities may be provided by a prediction service utilized by the web browser. The browser may include a configuration setting allowing the user to either enable or disable the prediction service as desired. Accordingly, steps 506, 508, 510 and 512 of method 500 correspond to the identifying additional search query options based on the user's search or browsing history (step 510 and 512) and/or other users' search activities using the prediction service, as described above. The additional search query options may be displayed as additional entries in the drop down list (e.g., below the first entry corresponding to the find in page search option), as described above.

Thus, step 514 includes dynamically updating in real time the entries being displayed within the drop-down list control element with the find in page search query option and the additional search query options predicted by the prediction service based on the search activities of the user and other users in general. As described above, each entry in the list may be displayed with a user-selectable graphical component (e.g., icons 422 or 424 of FIG. 4). In response to the user's selection of the search query option for find in page via the graphical component (as may be determined in step 516), method 500 proceeds to step 518, which includes performing a search query for finding the search term input by the user within the web page data loaded within the browser. The performed search query may be, for example, a text-based search for the search term within the web page data. Based on the results of the search query performed in step 518, method 500 proceeds to step 520, in which the web page data is displayed in a content area of the web browser so as to visually indicate to the user any occurrence of the search term within the web page. As described above, the browser may use any of various conventional or other techniques to provide such visual indication. These techniques may include, for example, various graphics or text-formatting techniques.

Benefits of method 500 may include, but are not limited to, enabling the user to not only search for items and web pages over the web based on a search term entered into a search field of the browser, but also to search for the term itself in a web page the user is either currently viewing or will be viewing relatively soon. Method 500 may be particularly useful for mobile browsers, since, unlike desktop browsers, users of mobile browsers cannot take advantage of any keyboard accelerators or shortcuts to quickly find search terms located within the data of a web page using a mobile browser.

Figure 6:
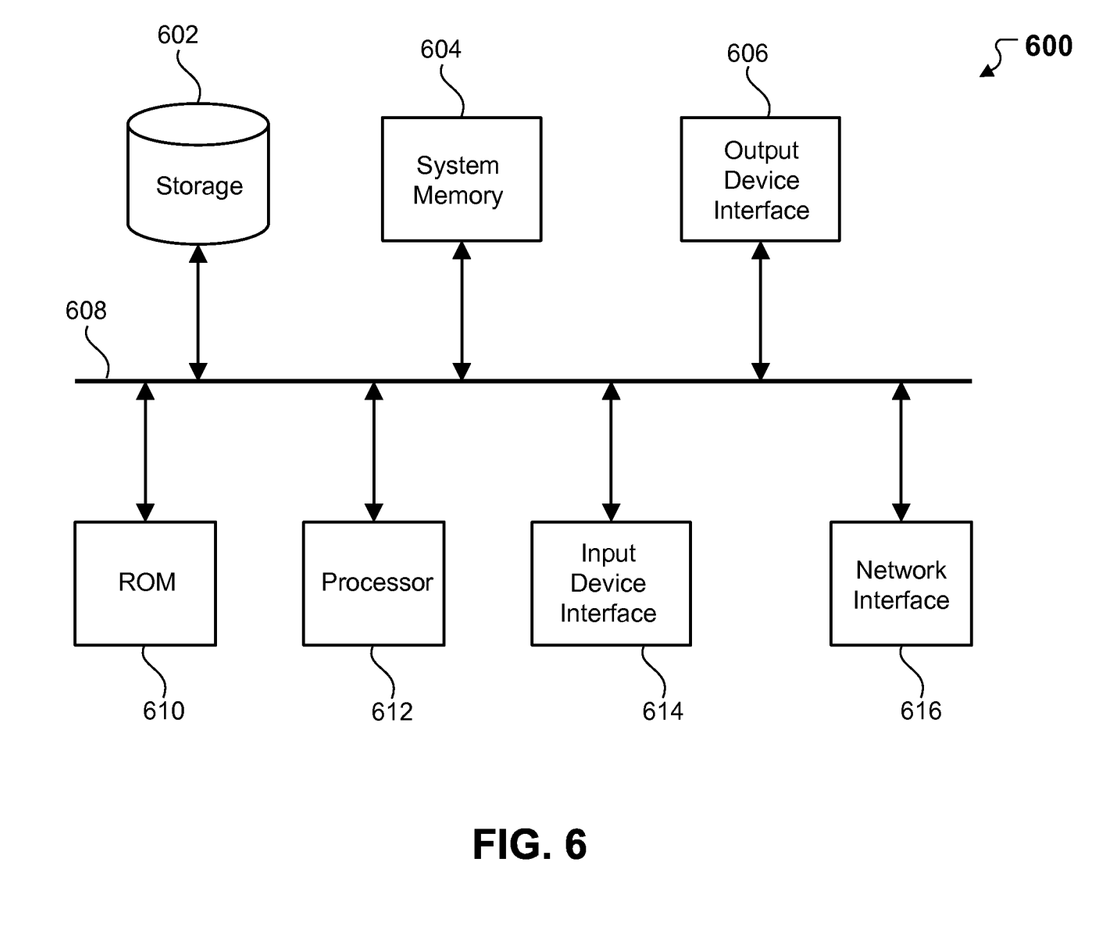
FIG. 6 is a diagram of an example computer system in which some of the subject technology may be implemented.

FIG. 6 conceptually illustrates an example electronic system 600 with which some implementations of the subject technology are implemented. For example, any of client devices 110a-c of FIGS. 1 and 2 or computing system 130 of FIG. 1, as described above, may be implemented using electronic system 600. Electronic system 600 can be a computer, phone, PDA, or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as permanent storage device 602.

Other implementations use a removable storage device (such as a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, and/or ROM 610. For example, the various memory units include instructions for performing a search query within a web browser in accordance with some implementations. From these various memory units, processing unit(s) 612 retrieves instructions to execute and data to process in order to execute the processes of some implementations (e.g., the steps of method 500 of FIG. 5, as described above).

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, such as cathode ray tubes (CRT) or liquid crystal displays (LCD). Some implementations include devices such as a touchscreen that functions as both input and output devices.

Finally, as shown in FIG. 6, bus 608 also couples electronic system 600 to a network (not shown) through a network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A method implemented in a computing device comprising a physical storage device and memory, the method comprising:

displaying, by the computing device, a web page in a web browser, wherein the web page includes web page text;

while the computing device is displaying the web page, receiving, by the computing device, a search term via a search field of the web browser;

determining, by the computing device, whether the search term occurs at least once within the web page text;

responsive to determining that the search term occurs at least once within the web page text, generating, by the computing device and based on the search term, a first search query option and a second search query option, wherein the first search query option comprises a web search of the search term and the second search query option comprises a search of the search term within the web page text without performing the web search of the search term;

displaying, by the computing device, the first search query option and the second search query option within the web browser at a location associated with the search field;

receiving, by the computing device, a selection of the second search query option; and displaying, by the computing device, based on the selection of the second search query option, a notification of at least one occurrence of the search term within the web page text.

2. The method of claim 1, wherein displaying the first search query option and the second query option further comprises displaying a user-selectable graphical component for selecting one of the first search query option and the second search query option.

3. The method of claim 1, wherein the search field is included within an address bar of the web browser, the address bar enabling a user to enter a uniform resource locator associated with the web page.

4. The method of claim 1, further comprising:
receiving a selection of the first search query option; and
performing, based on the selection of the first search query option, a web search of the search term.

5. The method of claim 1, further comprising identifying, based on a browsing history stored for the web browser, a previously viewed web site corresponding to the search term.

6. The method of claim 1, further comprising identifying a web site designated as being a favorite corresponding to the search term.

7. The method of claim 1, further comprising identifying a bookmarked web site corresponding to the search term.

8. The method of claim 1, further comprising: generating, based on the search term, a predicted search option.

9. The method of claim 8, wherein displaying the first search query option and the second search query option at a location associated with the search field of the web browser comprises displaying the first search query option and the second search query options in a drop-down list, and wherein the method further comprises dynamically updating the drop-down list to include the predicted search option.

10. A system, comprising:
one or more processors; and
a machine-readable medium comprising instructions stored therein, which when executed by the processors, cause the processors to:
provide, for display, a web page in a web browser, wherein the web page includes web page text;
while the web page is being displayed, acquire a search term via a search field of the web browser;
determine whether the search term occurs at least once within the web page text;
responsive to determining that the search term occurs at least once within the web page text, generate, based on the search term, a first search query option and a second search query option;
provide, for display, the first search query option and the second search query option, wherein the first search query option comprises an option to perform a web search of the search term and the second search query option comprises an option to perform a search of the search term within the web page text without performing the web search of the search term; and
provide for display, in response to receiving a selection of the second search query option, a notification of at least one occurrence of the search term within the web page text.

11. The system of claim 10, wherein the first search query option and the second search query option are displayed within a drop-down list control element in association with the web browser.

12. The system of claim 10, wherein the instructions that cause the processors to provide, for display, the first search query option and the second search query option include instructions that cause the processors to provide, for display, a user-selectable graphical component for each of the first search query option and the second search query option.

13. The system of claim 10, wherein the instructions further cause the processors to:
generate, based on the search term, a predicted search option based on the first or second search query option to be displayed; and
dynamically update the first and second search query options being displayed based on the predicted search option.

14. The system of claim 10, wherein the search field is included within an address bar of the web browser, the address bar enabling a user to enter a uniform resource locator associated with the web page.

15. The system of claim 10, wherein the search field is configured to receive input for a web-based search.

16. The system of claim 10, wherein the first search query option, the second search query option, and a graphical component for the first and second search query options are displayed within the search field of the web browser.

17. A non-transitory machine-readable storage medium comprising instructions stored therein, which when executed by a processor, causes the processor to:
provide, for display, a web page in a web browser, wherein the web page includes web page text;
while the web page is being displayed, acquire a search term via a search field of the web browser;
determine whether the search term occurs at least once within the web page text;
responsive to determining that the search term occurs at least once within the web page text, provide, for display, a first search query option in association with the search field of the web browser, wherein the first search query option is an option for performing a search of the search term within the web page text of the displayed web page without performing a web search;
perform a search for additional web page data related to at least a portion of the search term;
provide, for display, additional search query options based on results of the performed search, the additional search query options being displayed in association with the search field of the web browser; and responsive to receiving a search query option selection, provide, for display, a notification of at least one occurrence of the search term within the web page text.

18. The non-transitory machine-readable storage medium of claim 17, wherein the instructions further cause the processor to:
- receive a selection of the first search query option by a user;
- responsive to receiving the selection, perform a text-based search for the search term within the web page text of the displayed web page;
- provide, for display, the web page text of the displayed web page in a content area of the web browser, wherein the displayed web page text identifies at least one occurrence of the search term within the web page; and
- generate predictions for the first search query option and the additional search query options based on the portion of the search term,
- wherein the first search query option and the additional search query options are provided for display based on the generated predictions.

\* \* \* \* \*